(12) United States Patent
Owens

(10) Patent No.: US 6,417,153 B1
(45) Date of Patent: Jul. 9, 2002

(54) AZEOTROPE-LIKE COMPOSITIONS AND THEIR USE

(75) Inventor: John G. Owens, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 195 days.

(21) Appl. No.: 09/620,505

(22) Filed: Jul. 20, 2000

(51) Int. Cl.$^7$ .............. C11D 7/26; C11D 7/24; C11D 7/50

(52) U.S. Cl. .............. 510/411; 510/177; 510/273; 510/412; 510/415; 252/67; 252/79.3; 134/38; 134/39; 134/40; 134/42

(58) Field of Search .............. 510/411, 177, 510/506, 273, 412, 415; 252/67; 79.3; 134/40, 38, 39, 42

(56) References Cited

U.S. PATENT DOCUMENTS

| | | | |
|---|---|---|---|
| 5,814,595 A | | 9/1998 | Flynn et al. |
| 5,827,812 A | | 10/1998 | Flynn et al. |
| 6,043,201 A | * | 3/2000 | Milbrath et al. |
| 6,159,917 A | * | 12/2000 | Baran, Jr. et al. |
| 6,281,185 B1 | * | 8/2001 | Owens et al. |
| 6,303,080 B1 | * | 10/2001 | Tuma |

OTHER PUBLICATIONS

Article: Tuma, "New Green Heat Transfer Fluids," *Solid State Technology*, Cowan Publishing Corporation, Washington, U.S., vol. 43, No. 6, Jun. 2000, pp. 175–176, 178, 180, 182.
Abstract: Derwent Publications, Ltd., London, GB, Class A60, AN 1999–543687, JP2955597, (Agency of Ind. Sci. & Technology), Jan. 11, 2000.
Abstract: Derwent Publications Ltd., London, GB, Class D24, AN 2000–468152, JP2000154400, (Cosmo Kaihatsu KK), Jun. 6, 2000.
Abstract: Derwent Publication Ltd., London, GB, Class E16, AN 1998–141528, JP10018176, (Hakuyosha KK), Jan. 20, 1998.

* cited by examiner

Primary Examiner—Gregory E. Webb
(74) Attorney, Agent, or Firm—Lisa M. Fagan

(57) ABSTRACT

The invention provides azeotrope-like compositions consisting essentially of $R_fCF(OC_2H_5)CF(CF_3)_2$, where $R_f$ is a straight chain perfluoroalkyl group having 3 carbon atoms, and an organic solvent selected from the group consisting of: (a) unsubstituted straight chain, branched chain, and cyclic saturated alkanes containing 8 to 11 carbon atoms; (b) chlorinated straight chain, branched chain, and cyclic saturated alkanes containing 5 to 7 carbon atoms; (c) aromatic or unsaturated cyclic halogenated or unhalogenated hydrocarbons containing 7 to 10 carbon atoms; (d) esters containing 6 carbon atoms; (e) ketones containing 6 to 7 carbon atoms; (f) glycol ethers containing 6 carbon atoms; and (g) siloxanes containing 8 carbon atoms.

14 Claims, 9 Drawing Sheets

AZEOTROPE-LIKE COMPOSITIONS AND THEIR USE

FIELD OF THE INVENTION

This invention relates to azeotropes, azeotrope-like compositions, and methods of using azeotropes and azeotrope-like compositions to clean substrates, deposit coatings, transfer thermal energy, and as a reactant medium.

BACKGROUND OF THE INVENTION

Chlorofluorocarbons (CFCs), hydrochlorofluorocarbons (HCFCs), and hydrochlorocarbons (HCCs, e.g., 1,1,1-trichloroethane and carbon tetrachloride) have been used in a wide variety of solvent applications such as drying, cleaning (e.g., the removal of flux residues from printed circuit boards), and vapor degreasing. Such materials have also been used in refrigeration and heat-transfer processes. While these materials were initially believed to be environmentally benign, they have now been linked to ozone depletion. According to the Montreal Protocol and its attendant amendments, production and use of CFCs must be discontinued (see, e.g., P. S. Zurer, "Looming Ban on Production of CFCs, Halons Spurs Switch to Substitutes," *Chemical & Engineering News*, page 12, Nov. 15, 1993). The characteristics sought in replacements, in addition to low ozone depletion potential, typically have included boiling point ranges suitable for a variety of solvent cleaning applications, low flammability, and low toxicity. Solvent replacements also should have the ability to dissolve both hydrocarbon-based and fluorocarbon-based soils. Preferably, solvent replacements will also be low in toxicity, have no flash points (as measured by ASTM D3278-89), have acceptable stability, have short atmospheric lifetimes, and have low global warming potentials.

Certain perfluorinated (PFCs) and highly fluorinated hydrofluorocarbon (HFCs) materials have been evaluated as CFC and HCFC replacements in solvent applications. While these materials are generally sufficiently chemically stable, nontoxic, and non-flammable to be used in solvent applications, PFCs tend to persist in the atmosphere, and PFCs and HFCs are generally less effective than CFCs and HCFCs for dissolving or dispersing hydrocarbon materials. Also, mixtures of PFCs or HFCs with other organic solvents tend to be better solvents and dispersants for hydrocarbons than PFCs or HFCs alone.

Hydrofluoroethers (HFEs), or highly fluorinated ethers, have also gained interest as replacements for CFCs and HCFCs. HFEs are also chemically stable, have low toxicity, are non-flammable, and are non-ozone depleting. Segregated HFEs, a subclass of HFEs having all fluorine atoms segregated on one side of and/or between the ether oxygen atom(s), generally have an additional advantage, when compared to many of their non-segregated HFE counterparts, of having very short atmospheric lifetimes (typically less than 5 years and as low as 0.77 years). However, as with PFCs and HFCs, co-solvents with hydrocarbons are desirable to improve solvency and dispersibility.

Many azeotropes possess properties that make them useful solvents. For example, azeotropes have a constant boiling point which avoids boiling temperature drift during processing and use. In addition, when an azeotrope is used as a solvent, the properties of the solvent remain constant because the composition of the solvent does not change during boiling or reflux. Azeotropes that are used as solvents also can be recovered conveniently by distillation. For relatively low boiling (boiling point below 80° C.) segregated HFEs, such as $C_4F_9OCH_3$, $C_4F_9OC_2H_5$ and $C_3F_7OCH_3$, useful azeotropes and azeotrope-like compositions have been identified with hydrocarbon or chlorinated hydrocarbon solvents, such as paraffinic hydrocarbons, alcohols and chlorinated ethylenes. However, no azeotropes or azeotrope-like compositions have yet been identified which include higher boiling segregated HFEs. Higher boiling HFEs are particularly suitable for removing deposits which require a high temperature to soften, such as waxes, high-viscosity greases, etc., but higher boiling HFEs are generally relatively poor solvents when used alone.

Thus, there is a need for azeotrope or azeotrope-like compositions that can replace higher boiling chlorine-containing solvents such as trichloroethane, carbon tetrachloride, trichloroethylene, and perchloroethylene. Preferably, these compositions are non-flammable, have good solvency, are non-ozone depleting, and have a relatively short atmospheric lifetime so that they do not significantly contribute to global warming.

SUMMARY OF THE INVENTION

The present invention provides azeotropes and azeotrope-like compositions of a higher boiling segregated HFE. These compositions are preferably non-flammable, have good solvency, are non-ozone depleting, and have a relatively short atmospheric lifetime.

In one aspect, the present invention provides azeotrope and azeotrope-like compositions consisting essentially of a hydrofluoroether and an organic solvent. The hydrofluoroether, 3-ethoxy-perfluoro(2-methylhexane), is represented by the general formula $R_fCF(OC_2H_5)CF(CF_3)_2$, where $R_f$ is a straight chain perfluoroalkyl group having 3 carbon atoms. The organic solvent is selected from the group consisting of: (a) unsubstituted straight chain, branched chain, and cyclic saturated alkanes containing 8 to 11 carbon atoms; (b) chlorinated straight chain, branched chain, and cyclic saturated alkanes containing 5 to 7 carbon atoms; (c) aromatic or unsaturated cyclic halogenated or unhalogenated hydrocarbons containing 7 to 10 carbon atoms; (d) esters containing 6 carbon atoms; (e) ketones containing 6 to 7 carbon atoms; (f) glycol ethers containing 6 carbon atoms; and (g) siloxanes containing 8 carbon atoms.

While the concentrations of the hydrofluoroether and the organic solvent included in the azeotrope-like composition may vary somewhat from the concentrations found in the azeotrope formed between them, the boiling points of the azeotrope-like compositions are substantially the same as those of their corresponding azeotropes. Preferably, the azeotrope-like compositions boil at ambient pressure at temperatures that are within about 1° C. of the temperatures at which their corresponding azeotropes boil at the same pressure. Thus, the azeotrope-like compositions of the present invention include the corresponding azeotrope.

In another aspect, the present invention provides a method of cleaning objects by contacting the object to be cleaned with one or more of the azeotrope-like compositions of this invention or the vapor of such compositions until undesirable contaminants or soils on the object are dissolved, dispersed or displaced, and rinsed away.

In yet another aspect, the present invention provides a method of coating substrates using the azeotrope-like compositions as solvents or carriers for the coating material. The process comprises the step of applying to at least a portion of at least one surface of a substrate a coating composition comprising: (a) an azeotrope-like composition; and (b) at least one coating material which is soluble or dispersible in the azeotrope-like composition. Preferably, the process further comprises the step of removing the azeotrope-like composition from the coating composition, for example, by evaporation.

The present invention also provides coating compositions comprising an azeotrope-like composition and coating material which are useful in the coating process.

In yet another aspect, the present invention provides a method of transferring thermal energy using the azeotrope-like compositions as heat-transfer fluids.

In yet another aspect, this invention provides a method for preparing a desired organic compound by reacting one or more reactants in a reaction medium consisting essentially of the azeotrope-like compositions of the present invention.

DETAILED DESCRIPTION OF ILLUSTRATIVE EMBODIMENTS

An azeotropic composition or azeotrope is a constant boiling liquid mixture of two or more substances which behaves like a single substance in that the vapor produced by partial evaporation of liquid at its boiling point has the same composition as the liquid. Azeotropic compositions are constant boiling mixtures which exhibits either a maximum or a minimum boiling point as compared with other compositions of the same substances.

An azeotropic-like composition includes the corresponding azeotrope. Azeotrope-like compositions of the present invention are mixtures of hydrofluoroether and organic solvent which, if distilled using simple distillation (i.e., a one-plate distillation), produce a distillate fraction that is an azeotrope of the hydrofluoroether and organic solvent.

Figure 1:
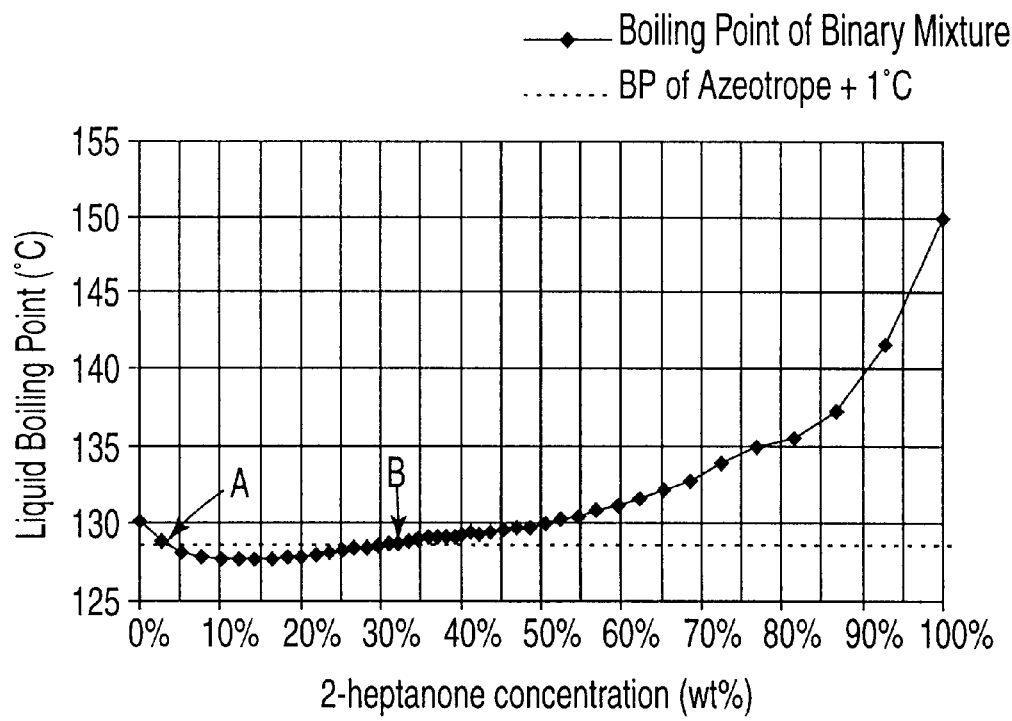
FIG. 1 is a graph of the boiling point versus the concentration of $C_3F_7CF(OC_2H_5)CF(CF_3)_2$ and 2-heptanone. Points A and B indicate the endpoints for the azeotrope-like composition.
Figure 2:
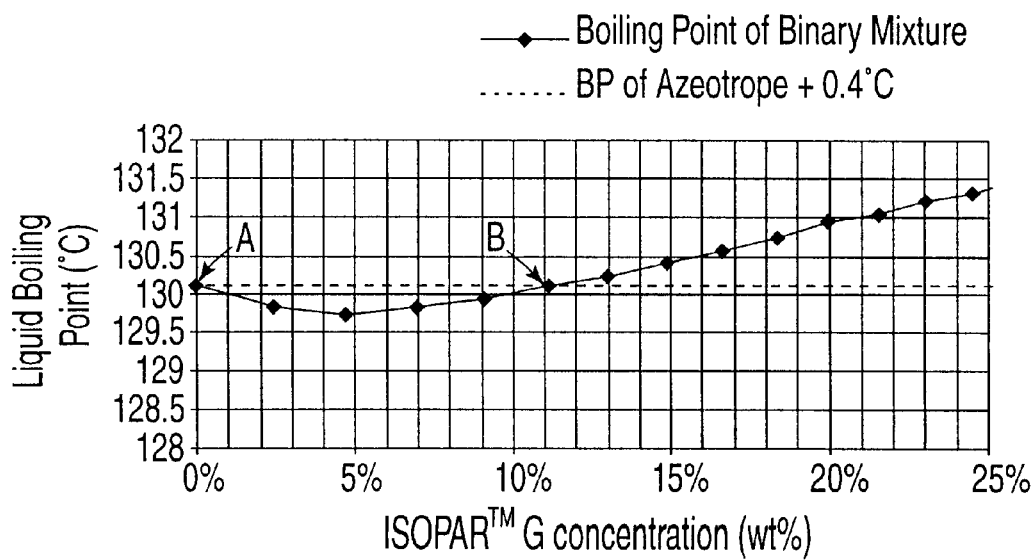
FIG. 2 is a graph of the boiling point versus the concentration of $C_3F_7CF(OC_2H_5)CF(CF_3)_2$ and ISOPAR™ G. Points A and B indicate the endpoints for the azeotrope-like composition.
Figure 3:
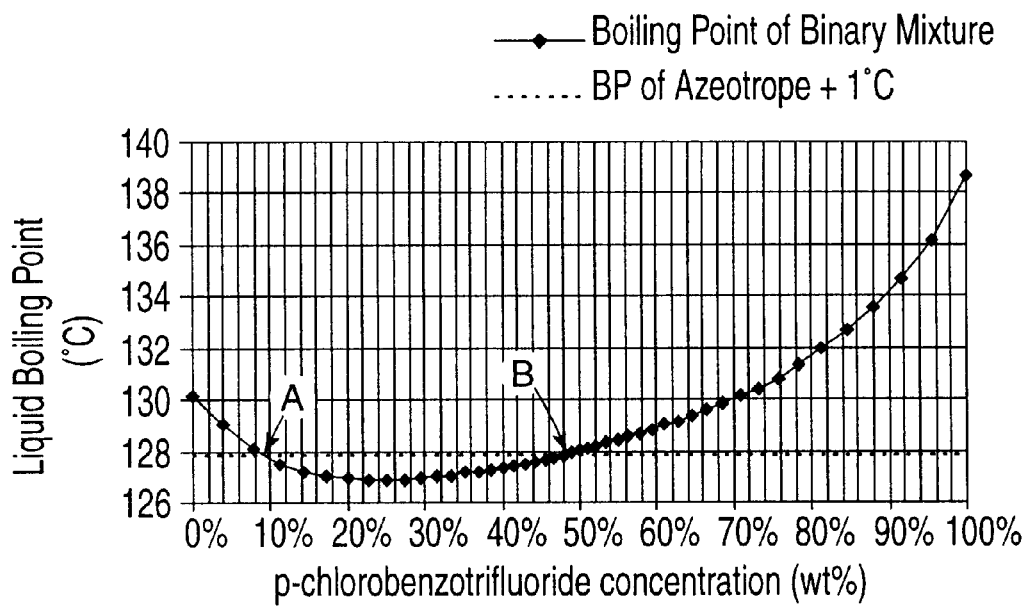
FIG. 3 is a graph of the boiling point versus the concentration of $C_3F_7CF(OC_2H_5)CF(CF_3)_2$ and p-chlorobenzotrifluoride. Points A and B indicate the endpoints for the azeotrope-like composition.
Figure 4:
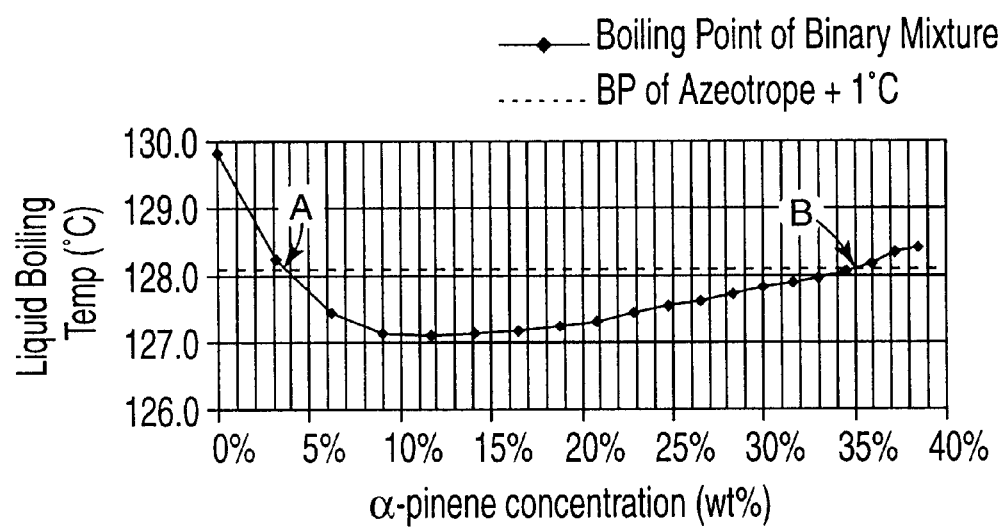
FIG. 4 is a graph of the boiling point versus the concentration of $C_3F_7CF(OC_2H_5)CF(CF_3)_2$ and alpha-pinene. Points A and B indicate the endpoints for the azeotrope-like composition.
Figure 5:
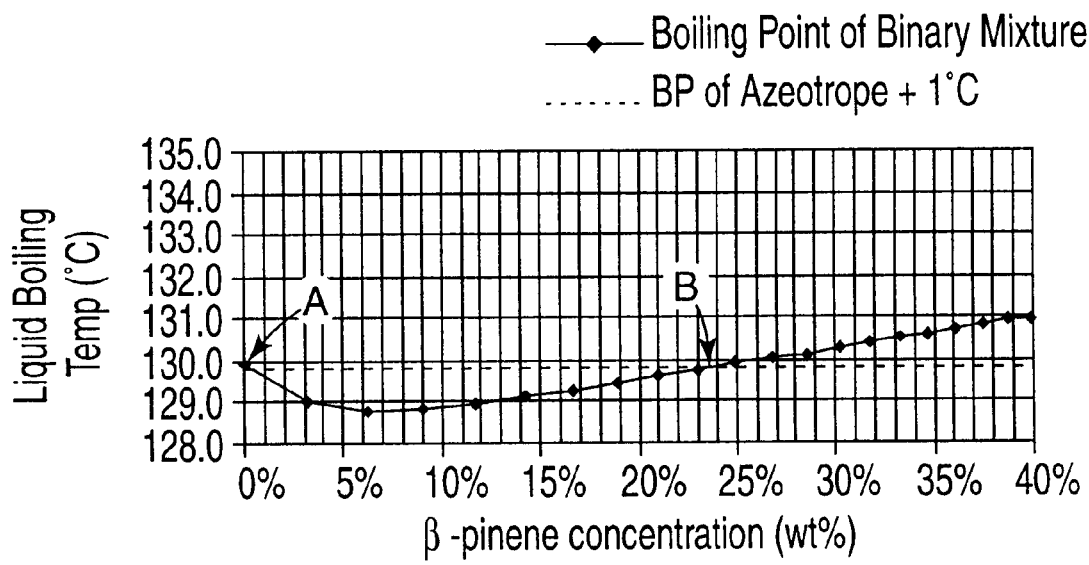
FIG. 5 is a graph of the boiling point versus the concentration of $C_3F_7CF(OC_2H_5)CF(CF_3)_2$ and beta-pinene. Points A and B indicate the endpoints for the azeotrope-like composition.
Figure 6:
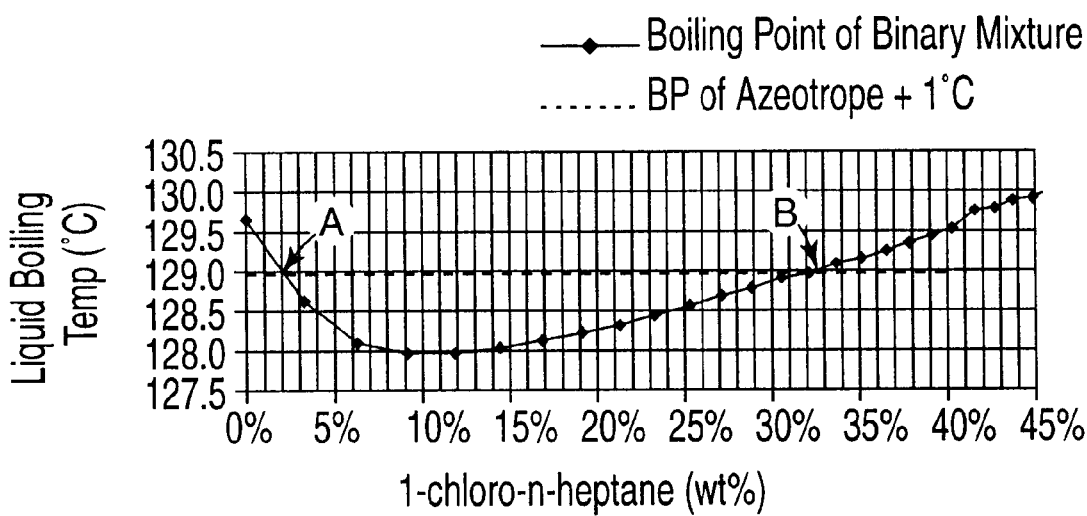
FIG. 6 is a graph of the boiling point versus the concentration of $C_3F_7CF(OC_2H_5)CF(CF_3)_2$ and 1-chloro-n-heptane. Points A and B indicate the endpoints for the azeotrope-like composition.
Figure 7:
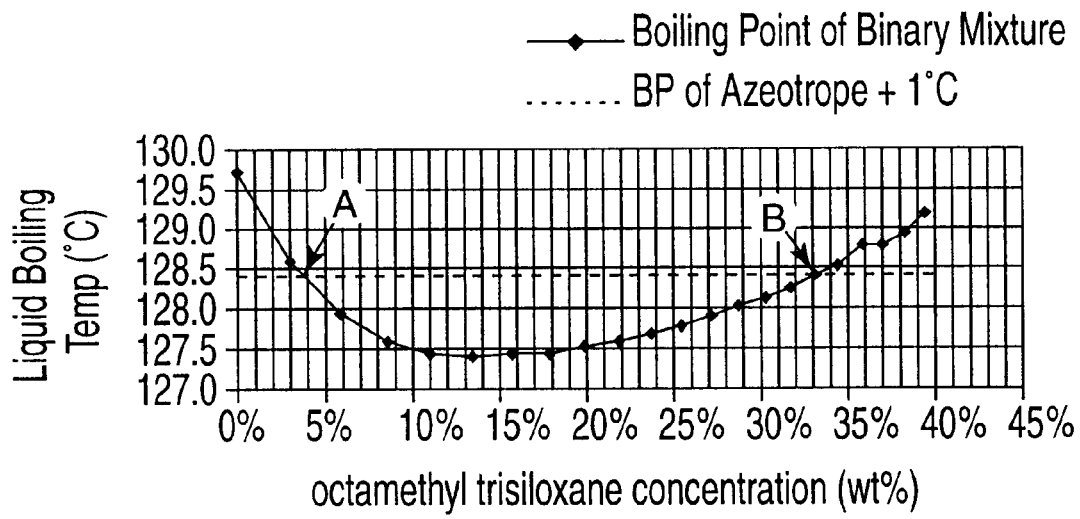
FIG. 7 is a graph of the boiling point versus the concentration of $C_3F_7CF(OC_2H_5)CF(CF_3)_2$ and octamethyl trisiloxane. Points A and B indicate the endpoints for the azeotrope-like composition.
Figure 8:
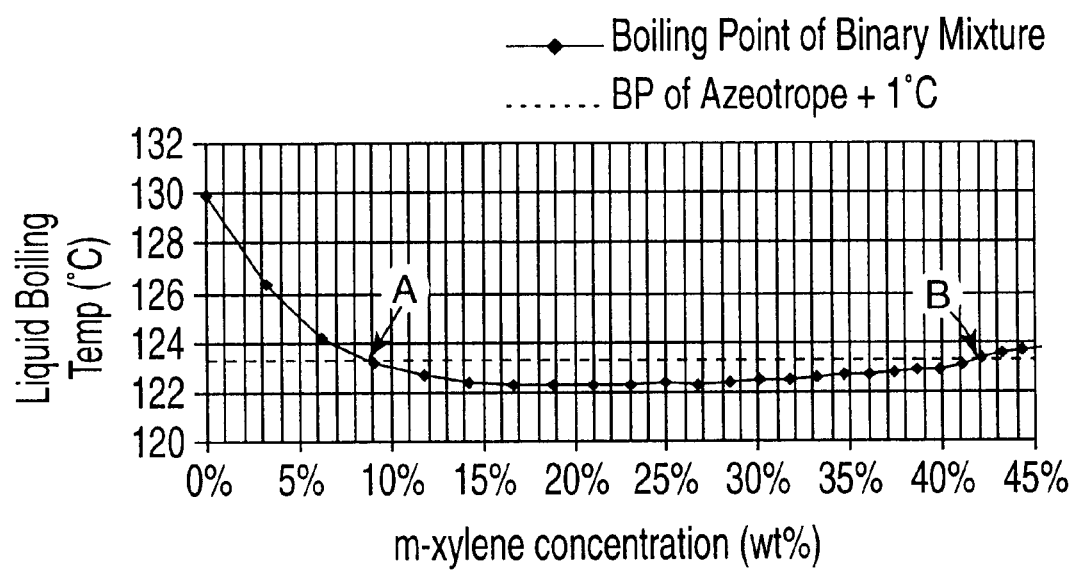
FIG. 8 is a graph of the boiling point versus the concentration of $C_3F_7CF(OC_2H_5)CF(CF_3)_2$ and m-xylene. Points A and B indicate the endpoints for the azeotrope-like composition.
Figure 9:
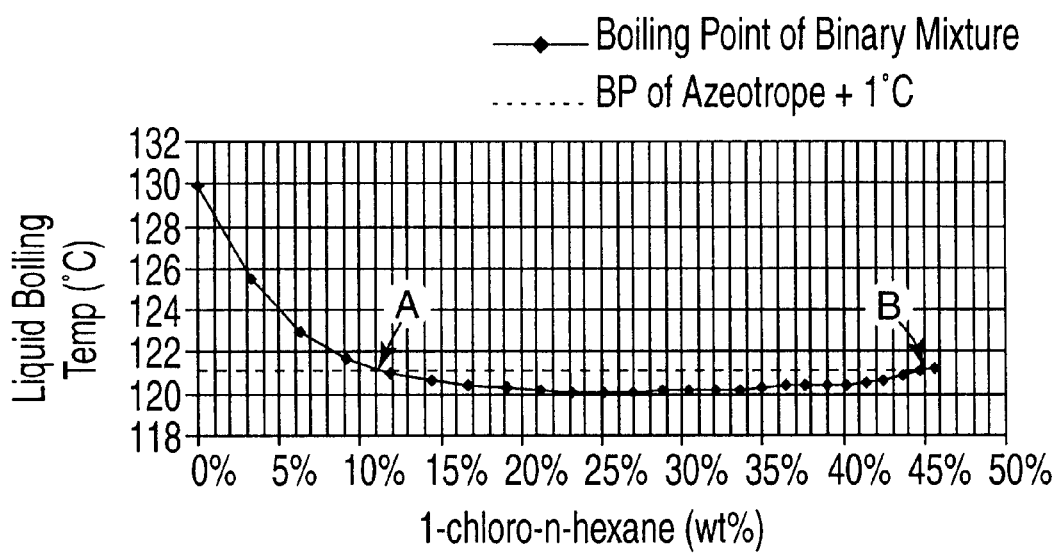
FIG. 9 is a graph of the boiling point versus the concentration of $C_3F_7CF(OC_2H_5)CF(CF_3)_2$ and 1-chloro-n-hexane. Points A and B indicate the endpoints for the azeotrope-like composition.
Figure 10:
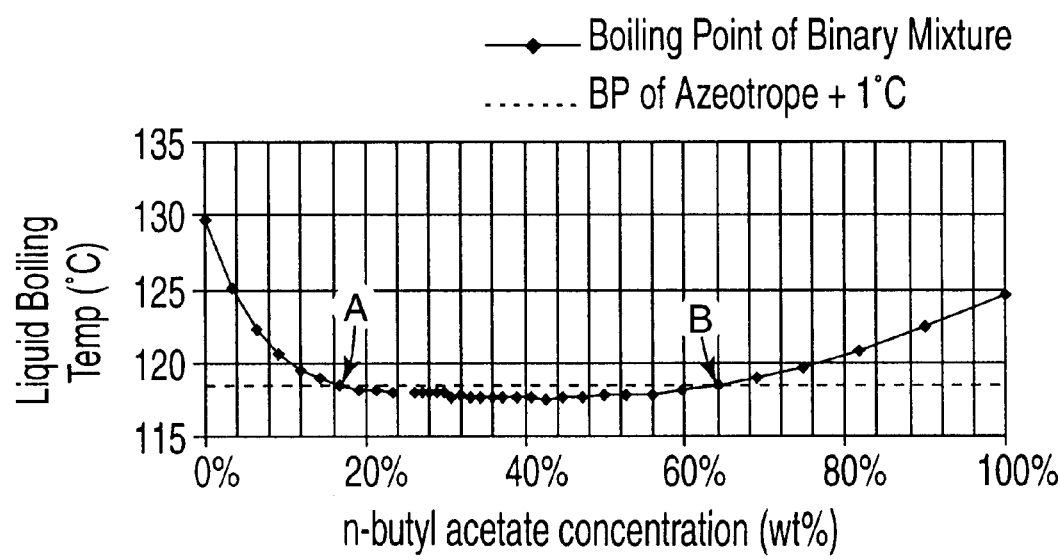
FIG. 10 is a graph of the boiling point versus the concentration of $C_3F_7CF(OC_2H_5)CF(CF_3)_2$ and n-butyl acetate. Points A and B indicate the endpoints for the azeotrope-like composition.
Figure 11:
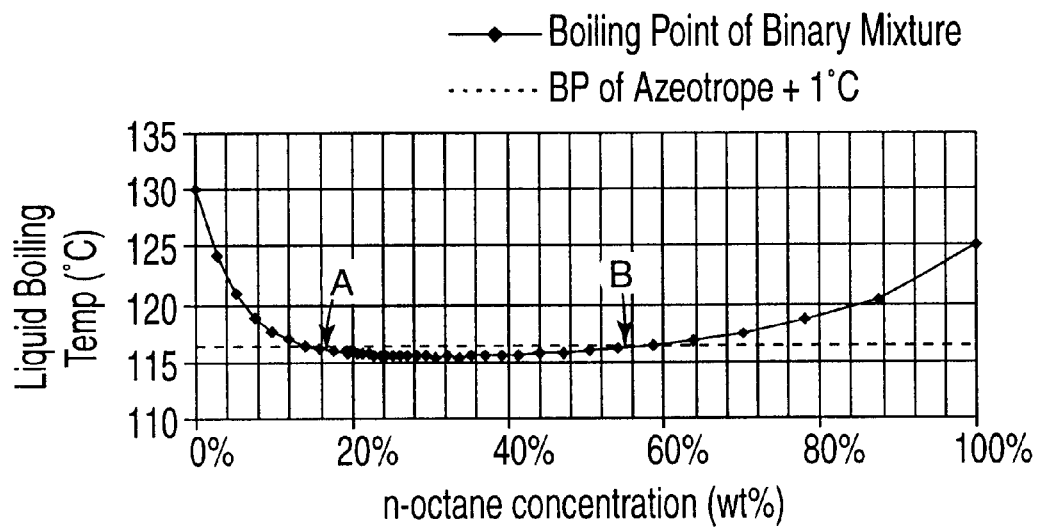
FIG. 11 is a graph of the boiling point versus the concentration of $C_3F_7CF(OC_2H_5)CF(CF_3)_2$ and n-octane. Points A and B indicate the endpoints for the azeotrope-like composition.
Figure 12:
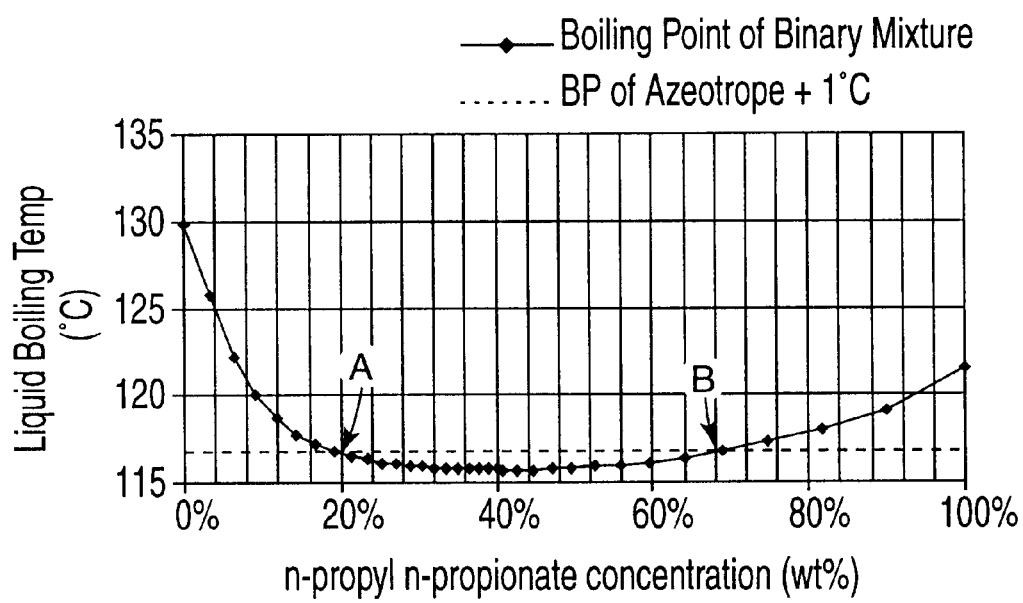
FIG. 12 is a graph of the boiling point versus the concentration of $C_3F_7CF(OC_2H_5)CF(CF_3)_2$ and n-propyl n-propionate. Points A and B indicate the endpoints for the azeotrope-like composition.
Figure 13:
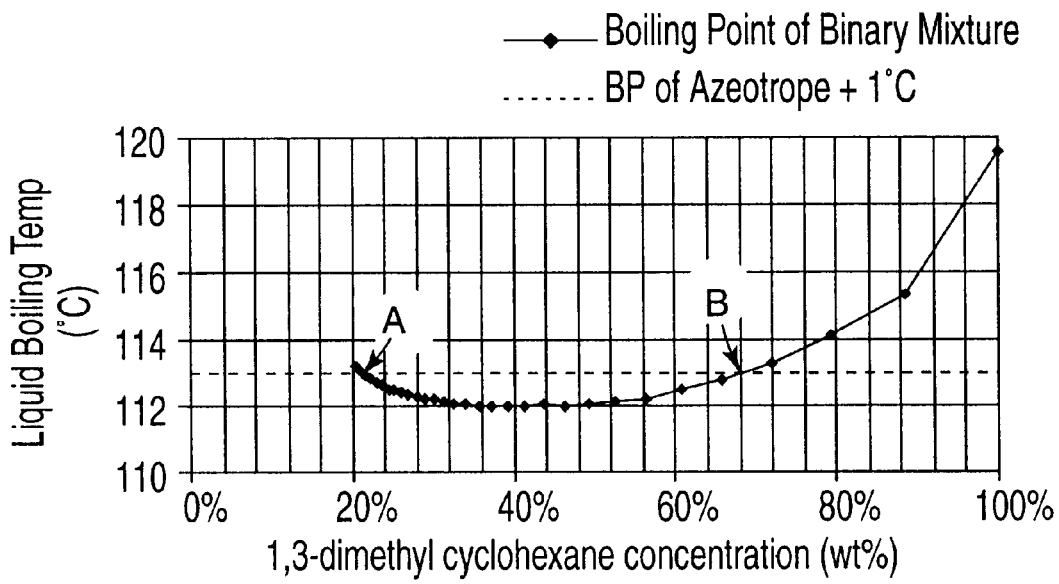
FIG. 13 is a graph of the boiling point versus the concentration of $C_3F_7CF(OC_2H_5)CF(CF_3)_2$ and 1,3-dimethyl cyclohexane. Points A and B indicate the endpoints for the azeotrope-like composition.
Figure 14:
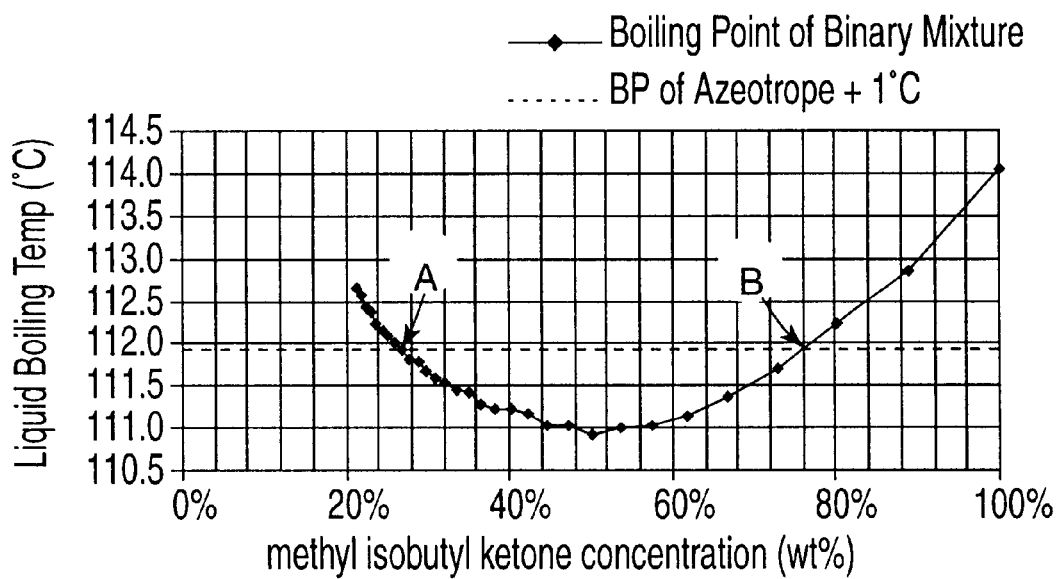
FIG. 14 is a graph of the boiling point versus the concentration of $C_3F_7CF(OC_2H_5)CF(CF_3)_2$ and methyl isobutyl ketone. Points A and B indicate the endpoints for the azeotrope-like composition.
Figure 15:
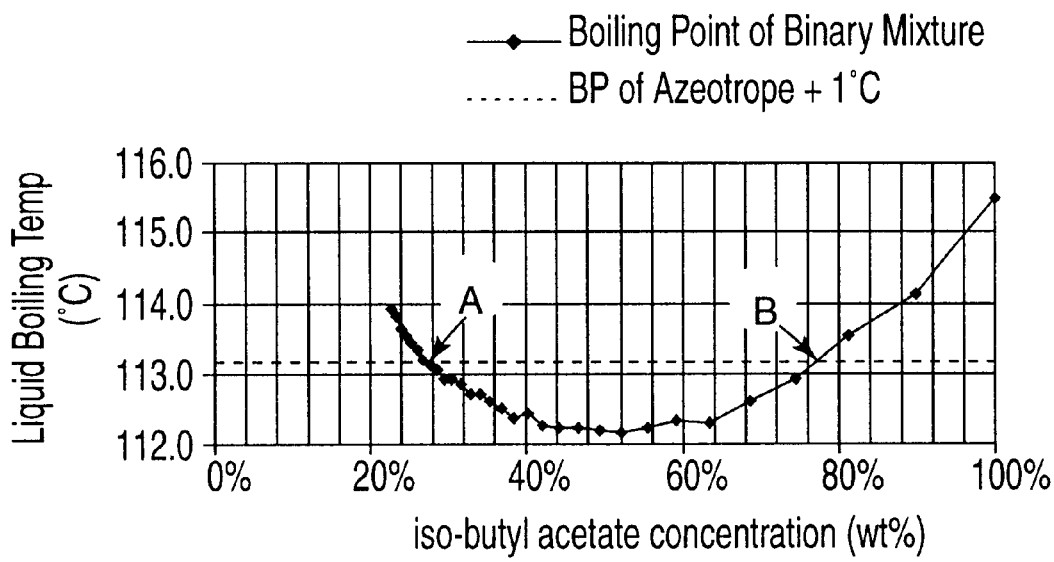
FIG. 15 is a graph of the boiling point versus the concentration of $C_3F_7CF(OC_2H_5)CF(CF_3)_2$ and iso-butyl acetate. Points A and B indicate the endpoints for the azeotrope-like composition.
Figure 16:
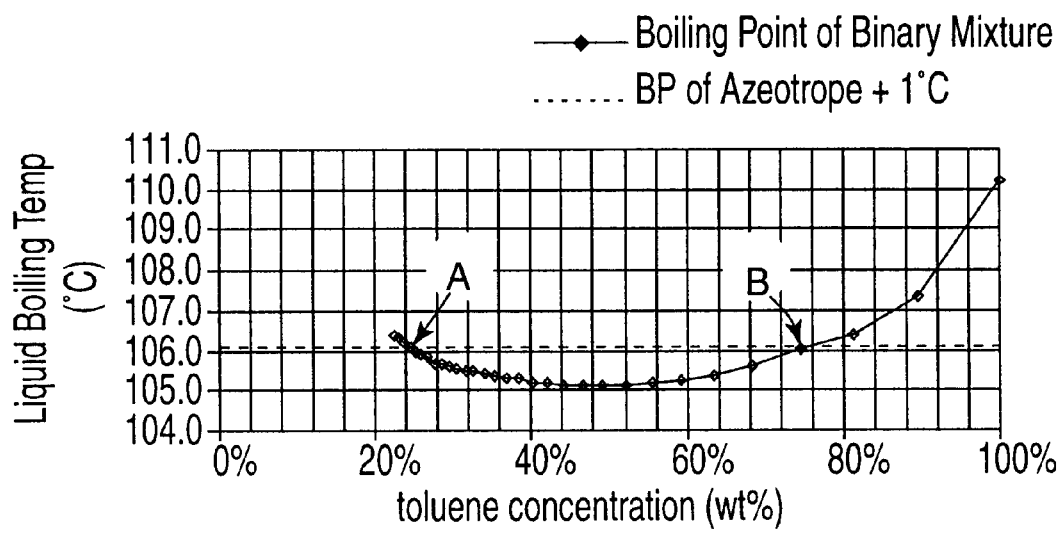
FIG. 16 is a graph of the boiling point versus the concentration of $C_3F_7CF(OC_2H_5)CF(CF_3)_2$ and toluene. Points A and B indicate the endpoints for the azeotrope-like composition.
Figure 17:
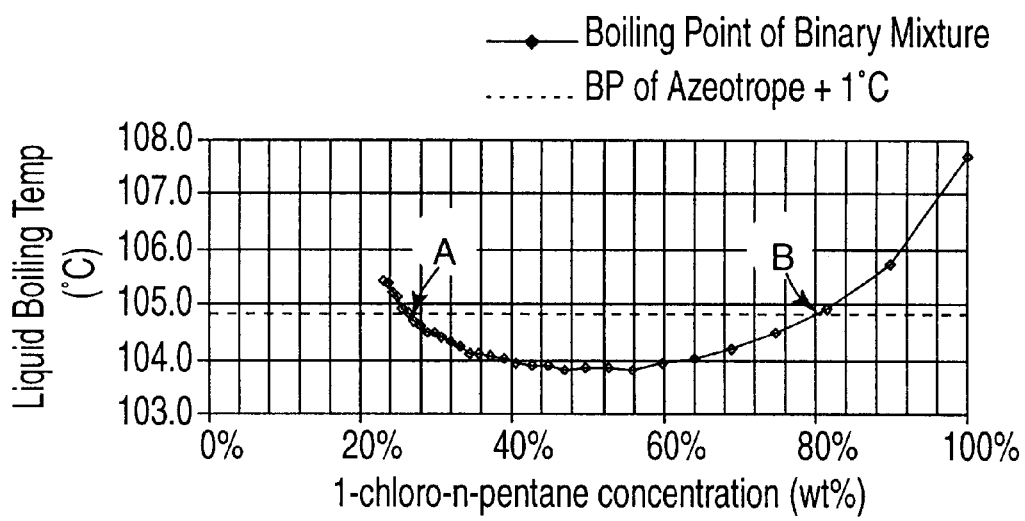
FIG. 17 is a graph of the boiling point versus the concentration of $C_3F_7CF(OC_2H_5)CF(CF_3)_2$ and 1-chloro-n-pentane. Points A and B indicate the endpoints for the azeotrope-like composition.
Figure 18:
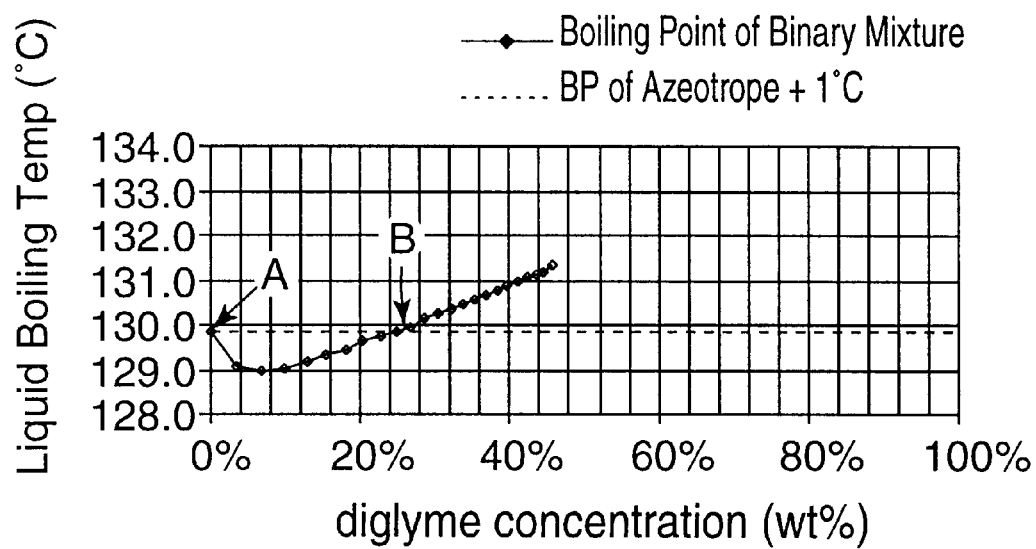
FIG. 18 is a graph of the boiling point versus the concentration of $C_3F_7CF(OC_2H_5)CF(CF_3)_2$ and diglyme. Points A and B indicate the endpoints for the azeotrope-like composition.

The azeotrope-like compositions boil at temperatures that are essentially the same as the boiling points of their corresponding azeotropes. Preferably, the boiling point of an azeotrope-like composition at ambient pressure is within about 1° C. of the boiling point of its azeotrope measured at the same pressure. See the FIGS. Note for ISOPAR™ G, the boiling point of an azeotrope-like composition at ambient pressure is within about 0.4° C. of the boiling point of its azeotrope measured at the same pressure. See FIG. 2.

The concentration of the hydrofluoroether and organic solvent in a particular azeotrope-like composition may vary substantially from the corresponding azeotropic composition, and the magnitude of such permissible variation depends upon the organic solvent. Most preferably, the azeotropic-like composition contains essentially the same concentrations of the ether and the solvent as are contained in the azeotrope formed between them at ambient pressure. Where the concentrations of ether and organic solvent in an azeotrope-like composition differ from the concentrations contained in the corresponding azeotrope, the preferred compositions contain a concentration of the ether that is in excess of the ether's concentration in the azeotrope. Such compositions are likely to be less flammable than azeotrope-like compositions in which the organic solvent is present in a concentration that is in excess of its concentration in the azeotrope. The most preferred compositions exhibit no significant change in the solvent power of the composition over time.

The azeotrope-like compositions of this invention may also contain, in addition to the hydrofluoroether and the organic solvent, small amounts of other compounds which do not interfere in the formation of the azeotrope. For example, small amounts of surfactants may be present in the azeotrope-like compositions of the present invention to improve the dispersibility or the solubility of materials, such as water, soils, or coating materials (e.g., perfluoropolyether lubricants and fluoropolymers), in the azeotrope-like composition.

Hydrofluoroether

The hydrofluoroether of the present invention, 3-ethoxy-perfluoro(2-methylhexane), can be represented by the following general formula:

$$R_fCF(OC_2H_5)CF(CF_3)_2 \quad (I)$$

where, in the above formula, $R_f$ is a straight chain (i.e., linear) perfluoroalkyl group having 3 carbon atoms.

3-ethoxy-perfluoro(2-methylhexane), $n-C_3F_7CF(OC_2H_5)CF(CF_3)_2$, can be manufactured as a very high purity product, most conveniently by employing a two-stage reaction wherein a perfluorinated ketone, perfluoro(2-methyl-3-hexanone), having the structure $n-C_3F_7C(O)CF(CF_3)_2$, is first made, which in turn is alkylated with an ethyl group-donating alkylating agent to give the desired secondary ether. Perfluoro(2-methyl-3-hexanone) can be prepared by reacting perfluoro(n-propyl)carbonyl fluoride ($n-C_3F_7COF$, 85 percent minimum purity) with hexafluoropropylene ($CF_2=CFCF_3$) in the presence of an anhydrous fluoride ion donor in an anhydrous polar aprotic solvent in a pressurized reaction vessel, such as a Parr reactor, at a temperature of about 70° C. for about 3 hours. Suitable anhydrous fluoride ion donors include anhydrous alkali metal fluoride (e.g., potassium fluoride or cesium fluoride) or anhydrous silver fluoride; anhydrous potassium fluoride (spray dried, stored at 125° C., ground to a granular powder shortly before use) is preferred. Suitable anhydrous polar aprotic solvents include acyclic ethers such as diethyl ether, ethylene glycol dimethyl ether (glyme), and diethylene glycol dimethyl ether (diglyme); carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof; preferably, the polar aprotic solvent is diethylene glycol dimethyl ether (diglyme).

Then, a slight molar excess of an ethyl group-donating alkylating agent and a quaternary ammonium salt, such as a triallyl monomethyl ammonium halide (e.g., ADOGEN™ 464, available from the Witco Corp., Oleo/Surfactant Group, Greenwich, Conn.) are mixed with the perfluoro(2-methyl-3-hexanone), and the resulting mixture is heated to about 50° C. for about 3 days with maximum agitation. Suitable ethyl group-donating alkylating agents include diethyl sulfate, ethyl iodide, ethyl p-toluenesulfonate, and ethyl perfluoromethanesulfonate; diethyl sulfate is the preferred alkylating agent. The reactor is then charged with aqueous alkali, e.g., potassium hydroxide, and heated to about 85° C. for about 1½ hours. The contents of the reactor are then distilled to give a crude product containing about 85–90 percent of 3-ethoxy-perfluoro(2-methylhexane).

The crude product is fractionated (for example, using a 10-plate vacuum jacketed Oldershaw column), water-washed, and dried over a desiccant (such as anhydrous magnesium sulfate). NMR analysis of the purified product typically shows a purity after fractionation of greater than 99.7 percent 3-ethoxy-perfluoro(2-methylhexane), with over 95 percent isomeric purity.

General preparative methods for the ethers are also described in French Patent No. 2,287,432 and German Patent No. 1,294,949.

The perfluorinated acyl fluoride (for use in preparing the hydrofluoroether) can be prepared by electrochemical fluorination (ECF) of the corresponding hydrocarbon carboxylic acid (or a derivative thereof), using either anhydrous hydrogen fluoride (Simons ECF) or KF-2HF (Phillips ECF) as the electrolyte. The perfluorinated acyl fluoride and perfluorinated ketone can also be prepared by dissociation of a perfluorinated carboxylic acid ester (which can be prepared from the corresponding hydrocarbon or partially-fluorinated carboxylic acid ester by direct fluorination with fluorine gas). Dissociation can be achieved by contacting the perfluorinated ester with a source of fluoride ion under reacting conditions (see the methods described in U.S. Pat. No. 3,900,372 (Childs) and U.S. Pat. No. 5,466,877 (Moore)), or by combining the ester with at least one initiating reagent selected from the group consisting of gaseous, non-hydroxylic nucleophiles; liquid, non-hydroxylic nucleophiles; and mixtures of at least one non-hydroxylic nucleophile (gaseous, liquid, or solid) and at least one solvent which is inert to acylating agents.

Organic Solvent

Typical organic solvents useful in this invention include: (a) unsubstituted straight chain, branched chain, and cyclic saturated alkanes containing 8 to 11 carbon atoms (e.g., n-octane, 1,3-dimethylcyclohexane and ISOPAR™ G (a mixture of high purity $C_{10}$–$C_{11}$ isoparaffinic hydrocarbons having very low aromatic content, available from Exxon Chemical Co., Houston, Tex.); (b) chlorinated straight and branched chain saturated alkanes containing 5 to 7 carbon atoms (e.g., 1-chloro-n-pentane, 1-chloro-n-hexane and 1-chloro-n-heptane); (c) aromatic and unsaturated cyclic halogenated or unhalogenated hydrocarbons containing 7 to 10 carbon atoms (e.g., toluene, m-xylene, (α-pinene, β-pinene, and p-chlorobenzotrifluoride; (d) esters containing 6 carbon atoms (e.g., n-butyl acetate, iso-butyl acetate, and n-propyl n-propionate); (e) ketones containing 6 to 7 carbon atoms (e.g., methyl isobutyl ketone and 2-heptanone); (f) glycol ethers containing 6 carbon atoms (e.g., diethylene glycol dimethyl ether (diglyme)); and (g) siloxanes containing 8 carbon atoms (e.g., octamethyl trisiloxane).

Azeotrope-like compositions containing 3-ethoxy-perfluoro(2-methylhexane) and the above-listed organic solvents include the following:

(i) compositions consisting essentially of about 86 to about 41 weight percent of 3-ethoxy-perfluoro(2-methylhexane) and about 14 to about 59 weight percent of n-octane that boil at about 115.5 to about 116.5° C. at about 760 torr;

(ii) compositions consisting essentially of about 79 to about 32 weight percent of 3-ethoxy-perfluoro(2-methylhexane) and about 21 to about 68 weight percent of 1,3-dimethylcyclohexane that boil at about 112.0 to about 113.0° C. at about 760 torr;

(iii) compositions consisting essentially of about 99.9 to about 89 weight percent of 3-ethoxy-perfluoro(2- methylhexane) and about 0.1 to about 11 weight percent of ISOPARTM™ G that boil at about 129.7 to about 130.1° C. at about 760 torr;

(iv) compositions consisting essentially of about 74 to about 20 weight percent of 3-ethoxy-perfluoro(2-methylhexane) and about 26 to about 80 weight percent of 1-chloro-n-pentane that boil at about 103.8 to about 104.8° C. at about 760 torr;

(v) compositions consisting essentially of about 89 to about 55 weight percent of 3-ethoxy-perfluoro(2-methylhexane) and about 11 to about 45 weight percent of 1-chloro-n-hexane that boil at about 120.1 to about 121.1° C. at about 760 torr;

(vi) compositions consisting essentially of about 98 to about 68 weight percent of 3-ethoxy-perfluoro(2-methylhexane) and about 2 to about 32 weight percent of 1-chloro-n-heptane that boil at about 128.0 to about 129.0° C. at about 760 torr;

(vii) compositions consisting essentially of about 76 to about 24 weight percent of 3-ethoxy-perfluoro(2-methylhexane) and about 24 to about 76 weight percent of toluene that boil at about 105.1 to about 106.1° C. at about 760 torr;

(viii) compositions consisting essentially of about 91 to about 58 weight percent of 3-ethoxy-perfluoro(2-methylhexane) and about 9 to about 42 weight percent of m-xylene that boil at about 122.3 to about 123.3° C. at about 760 torr;

(ix) compositions consisting essentially of about 96 to about 65 weight percent of 3-ethoxy-perfluoro(2-methylhexane) and about 4 to about 35 weight percent of α-pinene that boil at about 127.1 to about 128.1° C. at about 760 torr;

(x) compositions consisting essentially of about 99.7 to about 77 weight percent of 3-ethoxy-perfluoro(2-methylhexane) and about 0.3 to about 23 weight percent of β-pinene that boil at about 128.8 to about 129.8° C. at about 760 torr;

(xi) compositions consisting essentially of about 91 to about 52 weight percent of 3-ethoxy-perfluoro(2-methylhexane) and about 9 to about 48 weight percent of p-chlorobenzotrifluoride that boil at about 126.8 to about 127.8° C. at about 760 torr;

(xii) compositions consisting essentially of about 83 to about 36 weight percent of 3-ethoxy-perfluoro(2-methylhexane) and about 17 to about 64 weight percent of n-butyl acetate that boil at about 117.6 to about 118.6° C. at about 760 torr;

(xiii) compositions consisting essentially of about 73 to about 23 weight percent of 3-ethoxy-perfluoro(2-methylhexane) and about 27 to about 77 weight percent of isobutyl acetate that boil at about 112.2 to about 113.2° C. at about 760 torr;

(xiv) compositions consisting essentially of about 80 to about 31 weight percent of 3-ethoxy-perfluoro(2-methylhexane) and about 20 to about 69 weight percent of n-propyl n-propionate that boil at about 115.7 to about 116.7° C. at about 760 torr;

(xv) compositions consisting essentially of about 73 to about 24 weight percent of 3-ethoxy-perfluoro(2-methylhexane) and about 27 to about 76 weight percent of methyl isobutyl ketone that boil at about 110.9 to about 111.9° C. at about 760 torr;

(xvi) compositions consisting essentially of about 96 to about 69 weight percent of 3-ethoxy-perfluoro(2-methylhexane) and about 4 to about 31 weight percent of 2-heptanone that boil at about 127.7 to about 128.7° C. at about 760 torr;

(xvii) compositions consisting essentially of about 99.9 to about 75 weight percent of 3-ethoxy-perfluoro(2-methylhexane) and about 0.1 to about 25 weight percent of diethylene glycol dimethyl ether (diglyme) that boil at about 128.9 to about 129.9° C. at about 760 torr; and (xviii) compositions consisting essentially of about 96 to about 67 weight percent of 3-ethoxy-perfluoro(2-methylhexane) and about 4 to about 33 weight percent of octamethyl trisiloxane that boil at about 127.4 to about 128.4° C. at about 760 torr.

Preferably, the azeotrope-like compositions are homogeneous; i.e., they form a single phase under ambient conditions, i.e., at room temperature and atmospheric pressure. Also preferably, the azeotrope-like compositions are non-flammable, i.e., they have a flash point of greater than 100° F. (38° C.) or most preferably, have no flash point.

The azeotrope-like compositions are prepared by mixing the desired amounts of hydrofluoroether, organic solvent and any other minor components such as surfactants together using conventional mixing means.

Methods

In particular, the azeotrope-like compositions of the present invention may be used in cleaning processes, in heat-transfer processes, as refrigerants, as a reaction medium, as a blowing agent, as a coating liquid, and the like.

Cleaning, Water Displacement Processes

The cleaning process of the present invention can be carried out by contacting a contaminated substrate with one of the azeotrope-like compositions of this invention until the contaminants on the substrate are dissolved, dispersed or displaced in or by the azeotrope-like composition, and then removing (for example by rinsing the substrate with fresh, uncontaminated azeotrope-like composition or by removing a substrate immersed in an azeotrope-like composition from the bath and permitting the contaminated azeotrope-like composition to flow off of the substrate) the azeotrope-like composition containing the dissolved, dispersed, or displaced contaminant from the substrate. The azeotrope-like composition can be used in either the vapor or the liquid state (or both), and any of the known techniques for "contacting" a substrate can be utilized. For example, the liquid azeotrope-like composition can be sprayed or brushed onto the substrate, the vaporous azeotrope-like composition can be blown across the substrate, or the substrate can be immersed in either a vaporous or a liquid azeotrope-like composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182–94 (1986).

Both organic and inorganic substrates can be cleaned by the processes of the invention. Representative examples of the substrates include metals; ceramics; glass; silicon wafers; polymers such as: polycarbonate, polystyrene and acrylonitrile-butadiene-styrene copolymer; natural fibers (and fabrics derived therefrom) such as: cotton, silk, linen, wool, ramie; fur; leather and suede; synthetic fibers (and fabrics derived therefrom) such as: polyester, rayon, acrylics, nylon, polyolefin, acetates, triacetates and blends thereof; fabrics comprising a blend of natural and synthetic fibers; and composites of the foregoing materials. The process is especially useful in the precision cleaning of electronic components (e.g., circuit boards), optical or magnetic media, and medical devices and medical articles such as syringes, surgical equipment, implantable devices, and prosthesis.

The cleaning process of the invention can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; and other contaminants encountered in precision, electronic, metal, and medical device cleaning can be removed. The process is particularly useful for the removal of hydrocarbon contaminants (especially, light hydrocarbon oils), fluorocarbon contaminants, particulates, and water (as described in the next paragraph).

To displace or remove water from substrate surfaces, the cleaning process of the invention can be carried out as described in U.S. Pat. No. 5,125,978 (Flynn et al.) by contacting the surface of an article with an azeotrope-like composition which preferably contains a non-ionic fluoroaliphatic surface active agent. The wet article is immersed in the liquid azeotrope-like composition and agitated therein, the displaced water is separated from the azeotrope-like composition, and the resulting water-free article is removed from the liquid azeotrope-like composition. Further description of the process and the articles which can be treated are found in U.S. Pat. No. 5,125,978 and the process can also be carried out as described in U.S. Pat. No. 3,903,012 (Brandreth).

The azeotrope-like compositions of the present invention are also useful for extraction. Here, cleaning involves removing contaminants (e.g., fats, waxes, oils, or other solvents) by dissolution or displacement of these materials from substances (e.g., foods, cosmetics, pharmaceuticals).

Coating Processes

The azeotrope-like compositions can also be used in coating deposition applications, where the azeotrope-like composition functions as a carrier for a coating material to enable deposition of the material on the surface of a substrate. The invention thus also provides a coating composition comprising the azeotrope-like composition and a process for depositing a coating on a substrate surface using the azeotrope-like composition. The process comprises the step of applying to at least a portion of at least one surface of a substrate a coating of a liquid coating composition comprising (a) an azeotrope-like composition; and (b) at least one coating material which is soluble or dispersible in the azeotrope-like composition. The coating composition can further comprise one or more additives (e.g., surfactants, coloring agents, stabilizers, anti-oxidants, flame retardants, and the like). Preferably, the process further comprises the step of removing the azeotrope-like composition from the deposited coating by, e.g., allowing evaporation (which can be aided by the application of, e.g., heat or vacuum).

The coating materials which can be deposited by the process include pigments, lubricants, stabilizers, adhesives, anti-oxidants, dyes, polymers, pharmaceuticals, release agents, inorganic oxides, and the like, and combinations thereof. Preferred materials include perfluoropolyether, hydrocarbon, and silicone lubricants; amorphous copolymers of tetrafluoroethylene; polytetrafluoroethylene; and combinations thereof. Representative examples of materials suitable for use in the process include titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof. Any of the substrates described above (for cleaning applications) can be coated via the process of the invention. The process can be particularly useful for coating magnetic hard disks or electrical connectors with perfluoropolyether lubricants or medical devices with silicone lubricants.

To form a coating composition, the components of the composition (i.e., the azeotrope-like composition, the coating material(s), and any additive(s) utilized) can be combined by any conventional mixing technique used for dissolving, dispersing, or emulsifying coating materials, e.g., by mechanical agitation, ultrasonic agitation, manual agitation, and the like. The azeotrope-like composition and the coating material(s) can be combined in any ratio depending upon the desired thickness of the coating, but the coating material(s) preferably constitute from about 0.1 to about 10 weight percent of the coating composition for most coating applications.

The deposition process of the invention can be carried out by applying the coating composition to a substrate by any conventional technique. For example, the composition can be brushed or sprayed (e.g., as an aerosol) onto the substrate, or the substrate can be spin-coated. Preferably, the substrate is coated by immersion in the composition. Immersion can be carried out at any suitable temperature and can be maintained for any convenient length of time. If the substrate is a tubing, such as a catheter, and it is desired to ensure that the composition coats the lumen wall, it may be advantageous to draw the composition into the lumen by the application of reduced pressure.

After a coating is applied to a substrate, the azeotrope-like composition can be removed from the deposited coating by evaporation. If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

Heat-Transfer Processes

The azeotrope-like compositions can also be used a heat-transfer fluids in heat-transfer processes where the heat-transfer fluid can transfer thermal energy (i.e., heat) either in a direct or indirect manner. Direct heat transfer (sometimes called "direct contact heat transfer") refers to a heat-transfer process wherein a heat-transfer fluid conducts heat directly (i.e., through conduction and/or convection) to and/or from a heat source to a fluid by directly contacting the fluid with the heat source. Examples of direct heat transfer include the immersion cooling of electrical components and the cooling of an internal combustion engine.

Indirect heat transfer refers to a heat-transfer process wherein a heat-transfer fluid (sometimes called a "working fluid") conducts heat to and/or from a heat source without directly contacting the fluid with the heat source. Examples of indirect heat transfer include refrigeration, air conditioning and/or heating (e.g., using heat pumps) processes, such as are used in buildings, vehicles and stationary machinery. In one embodiment, the present invention provides a process for transferring heat comprising employing an azeotropic composition in this invention as a secondary loop refrigerant. In this embodiment, the secondary loop refrigerant (i.e., a wide temperature range liquid fluid) provides a means for transferring heat between the heat source (i.e., object to be cooled) and the primary loop refrigerant (i.e., a low temperature-boiling fluid which accepts heat by expanding to a gas and rejects heat by being condensed to a liquid, typically by using a compressor). Examples of equipment in which the azeotropic composition of this invention may be useful include, but are not limited to, centrifugal chillers, household refrigerator/freezers, automotive air conditioners, refrigerated transport vehicles, heat pumps, supermarket food coolers and display cases, and cold storage warehouses.

In indirect heat-transfer processes, lubricants can be incorporated in the working fluid where moving parts are involved to insure that the moving parts (e.g., pumps and valves) continue to work over long periods of time. Such lubricants should possess good thermal and hydrolytic stability and should exhibit at least partial solubility in the fluid. Examples of suitable lubricants include mineral oils, fatty esters, highly halogenated oils such as chlorotrifluoroethylene-containing polymers, and synthetic lubricants such as alkylene oxide polymers.

Reaction Medium p The azeotrope-like compositions of this invention are also useful as reaction media for a variety of reactions for preparing an organic compound. In particular, the azeotrope-like compositions have improved solvency power when compared to 3-ethoxy-perfluoro(2-methylhexane) used alone as a solvent. These azeotrope-like compositions can be used to replace higher boiling chlorofluorocarbons and hydrochlorofluorocarbons which have been shown to cause damage to the ozone layer in the stratosphere. The particular solvency of the reaction medium can be tailored by appropriate selection of the organic solvent in the azeotrope-like composition. This allows for the selection of an azeotrope-like composition that is a better solvent for the reactants than for the desired organic compound, thus allowing easy separation of the reactants from the desired organic compound (especially important in the preparation of polymers). As a result, non-flammable or low flammability azeotrope-like compositions with low toxicity can be employed having a wide variety of solubility parameters. The reaction media can additionally comprise additional compounds which participate in the reaction to form an organic compound, but which are substantially inert to the azeotrope-like composition, such as catalysts, initiators, scavengers, precipitation aids, chain terminators and chain transfer agents.

The azeotrope-like compositions can be used as reaction media for a wide variety of organic reactions. Such reactions include free radical polymerizations, condensation reactions, oxidation and reduction reactions, radical addition reactions, nucleophilic addition reactions, electrophilic addition reactions, and nucleophilic and electrophilic substitution reactions. The organic reactions can be of the type that require a catalyst or initiator which can be the free radical type (i.e., using an oxido-reduction mechanism), the cationic type or the anionic type. The azeotrope-like compositions are particularly suitable for use in organic reactions that involve one or more reactions that are fluorochemical compounds, because such compounds have excellent solubility in these compositions. In accordance with the present invention, the azeotrope-like compositions can be used as a reaction medium, in particular as a liquid solvent, in the free radical polymerization of a fluorochemical monomer (e.g., $C_4F_9SO_2N(CH_3)C_2H_4OC(O)CH=CH_2$). The fluorochemical monomer may be copolymerized with an ethylenically unsaturated monomer free of fluorine (e.g., $C_4H_9OC(O)CH=CH_2$). Further descriptions of suitable reactants, monomers, catalysts, initiators and reaction conditions can be found in PCT Published Patent Application WO 99/16809.

Objects and advantages of this invention are further illustrated by the following examples, but the particular materials and amounts thereof recited in these examples, as well as other conditions and details, should not be construed to unduly limit this invention.

EXAMPLES

The preparation, identification, and testing of the azeotrope-like compositions of this invention are further described in the following examples.

Preparation of 3-ethoxy-perfluoro(2-methylhexane)

3-ethoxy-perfluoro(2-methylhexane), $n-C_3F_7CF(OC_2H_5)CF(CF_3)_2$, used to prepare the azeotrope-like compositions and azeotropes of this invention, was synthesized as follows.

Into a dry 600 milliliter Parr reactor were added 36.3 grams (0.625 mole) of anhydrous potassium fluoride and 108 grams of anhydrous diglyme (diethylene glycol dimethyl ether). Potassium fluoride was made by spray drying, was stored at 125° C., and was ground shortly before use. The contents in the reactor were cooled with dry ice, then 125 grams (0.52 mole) of $n-C_3F_7COF$ (approximately 90 percent purity) was added. When the reactor reached a temperature of 52° C. and pressure of 65 psig (4190 torr), 101.5 grams (0.68 mole) of $CF_2=CFCF_3$ (hexafluoropropylene) was added at 70° C. and at a pressure range of 18–75 psig (1690–4640 torr) over approximately a 3 hour period, followed by a 2 hour hold period at 70° C. The reactor and its contents were allowed to cool to room temperature, the reactor was opened, and to the reactor were added an additional 1.5 grams of potassium fluoride, along with 14.5 grams (0.016 mole) of ADOGEN™ 464 surfactant (as a 50 percent solids solution in glyme) and 119.2 grams (0.77 mole) of diethyl sulfate. (ADOGEN™ 464 surfactant, available from Witco. Corp., Oleo/Surfactant Group, Greenwich, Conn., is a tri(octyl-decyl) monomethyl quaternary ammonium chloride, 90 percent active; for this experiment, the ADOGEN™ 464 was diluted with anhydrous glyme and was vacuum fractionated of alcohol solvent to a 50 weight percent concentration in glyme.) The Parr reactor was again sealed and was heated to 52° C. with maximum agitation for three days. The reactor was then pressure-charged with 60 grams of 45 weight percent aqueous potassium hydroxide and 50 grams of deionized water, was again sealed, and was heated to 85° C. for 1½ hours. The reaction was allowed to cool overnight, the reactor was vented, and its contents were transferred to a flask for distillation. 235.2 grams of product were recovered, representing a 96.9 percent yield based on the $n-C_3F_7COF$ charge. Percent purity was 88.7 percent, based on analysis by gas chromatograph.

The recovered crude product was fractionated on a 10-plate vacuum jacketed Oldershaw column, water-washed, and dried over anhydrous magnesium sulfate. A portion of the distilled and washed product was accurately weighed when placed into an NMR tube and was spiked with a known amount of 1,4-bis(trifluoromethyl)benzene (p-HFX) for use as a cross integration or internal standard. Then a 400 MHz 1H-NMR spectrum (#h56881.401) and a 376 MHz 19F-NMR spectra spectrum (#f56881.402) were measured at room temperature using a Varian UNITYplus 400 FT-NMR spectrometer. This method of preparation permitted the p-HFX to be used as either 1) an internal standard for measuring the absolute weight percent concentrations of specific components; or 2) as a cross integration standard to facilitate the cross correlation of the various fluorine and proton signal intensities for evaluation of the overall sample composition.

The results from the proton and fluorine NMR cross integration determination are shown below TABLE 1:

TABLE 1

| Component Structures | 1H/19F-NMR Relative Weight Percent (%) Concentrations (single trial measurement) |
|---|---|
| $CF_3CF_2CF_2CF(OCH_2CH_3)—CF(CF_3)_2$, 3-ethoxy-perfluoro(2-methylhexane) | 99.86% |
| $[(CF_3)_2—CF—]_2—CF—O—CH_2CH_3$ | 0.093% |
| $CF_3CF_2CF_2CF(OCH_3)—CF(CF_3)_2$ | 0.044% |
| $CF_3OCF_2CF_2CF(OCH_2CH_3)CF(CF_3)_2$ | 0.0057% |
| Possible Acetone | 0.0005% |

Results from the NMR analysis indicated the washed distillate to contain 99.96 percent of $n-C_3F_7CF(OC_2H_5)CF(CF_3)_2$, the desired product.

Analysis of several other $n-C_3F_7CF(OC_2H_5)CF(CF_3)_2$ preparations made using essentially the same synthetic and purification procedures showed percent purities of 99.71, 99.89 and 99.96 percent.

Examples 1–18 and Comparative Example C1

In Examples 1–18, the azeotropes of this invention were initially identified by screening mixtures of 3-ethoxy-perfluoro(2-methylhexane), i.e., $n-C_3F_7CF(OC_2H_5)CF(CF_3)_2$, and various organic solvents. Unless noted otherwise, the organic solvents used to prepare the azeotrope-like compositions described in these Examples were purchased commercially from Aldrich Chemical Company, Milwaukee, Wis. In Comparative Example C1, the 3-ethoxy-perfluoro(2-methylhexane) was evaluated alone as a pure solvent with no organic solvent added.

Mixtures of 3-ethoxy-perfluoro(2-methylhexane) and organic solvent were evaluated to determine the composition of the azeotrope. Mixtures of 3-ethoxy-perfluoro(2-methylhexane) and the organic solvent of interest were prepared and distilled at ambient lab pressure (725–739 torr) in a concentric tube distillation column (Model 9333, available from Ace Glass, Vineland, N.J.). The distillation was allowed to equilibrate at total reflux for at least 60 minutes. In each distillation, six successive distillate samples, each approximately 5 percent by volume of the total liquid charge, were taken while operating the column at a liquid reflux ratio of 20 to 1. The compositions of the distillate samples were then analyzed using an HP-5890 Series II Plus Gas Chromatograph with a 30m HP-5 (cross-linked 5 percent phenyl methyl silicone gum stationary phase, available from Hewlett Packard Co.), NUKOL™ (available from Supelco Inc., Bellefonte, Pa.), or STABILWAX DA™ (available from Altech Associates, Deerfield, Ill.) capillary column and a flame ionization detector. The boiling points of the distillate were measured using a thermocouple which was accurate to about 1° C. The compositional data and respective boiling points are reported in TABLE 2.

The 3-ethoxy-perfluoro(2-methylhexane) and its azeotropes were also tested for flammability by placing a small aliquot of each azeotrope in an open aluminum dish and holding a flame source in contact with the vapor of the azeotrope above the dish. Flame propagation across the vapor indicated that the azeotrope was flammable. The flammability data are presented in TABLE 2.

TABLE 2

| Ex | Organic Solvent Name | Organic Solvent Type | HFE Concentration (wt. %) | Organic Solvent Concentration (wt. %) | Azeotrope Boiling Point (° C.) | Pressure (torr) | Organic Solvent Boiling Point (° C.)** | Flammable ? |
|---|---|---|---|---|---|---|---|---|
| 1 | n-octane | unsubstituted straight chain, branched and cyclic saturated alkanes containing 8 to 11 carbon atoms | 71.6 | 28.4 | 113.1 | 731.9 | 125.6 | yes |
| 2 | 1,3-dimethyl cyclohexane | | 65.1 | 34.9 | 109.7 | 731.5 | 120–129 | yes |
| 3 | ISOPAR ™ G* | | 95.4 | 4.6 | 126.7 | 729.3 | 160–177*** | no |
| 4 | 1-chloro-n-pentane | chlorinated straight chain and branched saturated alkanes containing 5 to 7 carbon atoms | 53.4 | 46.6 | 102.9 | 725.9 | 107.8 | yes |
| 5 | 1-chloro-n-hexane | | 74.8 | 25.2 | 118.3 | 734.3 | 134.5 | yes |
| 6 | 1-chloro-n-heptane | | 93.1 | 6.9 | 126.0 | 738.4 | 159**** | no |
| 7 | toluene | aromatic and unsaturated cyclic halogenated or unhalogenated hydrocarbons containing 7 to 10 carbon atoms | 57.7 | 42.3 | 103.0 | 732.5 | 110.7 | yes |
| 8 | m-xylene | | 80.8 | 19.2 | 119.7 | 734.4 | 138.8 | yes |
| 9 | α-pinene | | 88.5 | 11.5 | 125.3 | 734.0 | 156–160 | no |
| 10 | β-pinene | | 94.2 | 5.8 | 126.7 | 732.7 | 164–169 | no |
| 11 | p-chloro-benzotrifluoride** | | 75.7 | 24.3 | 124.0 | 728.1 | 139.3 | no |
| 12 | n-butyl acetate | esters containing 6 carbon atoms | 67.9 | 32.1 | 116.0 | 732.0 | 126.3 | yes |
| 13 | iso-butyl acetate | | 56.8 | 43.2 | 110.1 | 732.2 | 117.2**** | yes |
| 14 | n-propyl n-propionate | | 63.8 | 36.2 | 114.2 | 731.9 | 122–124 | yes |
| 15 | methyl isobutyl ketone | ketones containing 6 to 7 carbon atoms | 59.1 | 40.9 | 109.2 | 732.9 | 115.8 | yes |
| 16 | 2-heptanone | | 89.6 | 10.4 | 126.0 | 738.2 | 150.6 | no |
| 17 | diethylene glycol dimethyl ether | glycol ethers containing 6 carbon atoms | 93.6 | 6.4 | 126.9 | 738.6 | 162.0 | no |
| 18 | octamethyl trisiloxane | siloxanes containing 8 carbon atoms | 87.1 | 12.9 | 125.2 | 733.7 | 151 | yes |
| C1 | NONE | HFE alone | 100.0 | — | 128.3 | 736.2 | — | no |

*A mixture of high purity isoparaffinic hydrocarbons with very low aromatic content, available from Exxon Chemical Co., Houston, TX
**The Condensed Chemical Dictionary, Edited by Gessner G. Hawley, NY, Van Nostrand Reinhold Co., 1981
***Material Safety Data Sheet for ISOPAR G ™, Exxon Chemical Company, Houston, TX
****Randbook of Chemistry and Physics, 64th Edition, R. C. Weast, ed., CRC Press Inc., Boca Raton, FL Examples 19–36 and Comparative Example C2

The azeotrope-like compositions of Examples 1–18 containing 3-ethoxy-perfluoro(2-methylhexane) were tested for their ability to dissolve normal hydrocarbons of increasing molecular weight according to a test procedure similar to that described in U.S. Pat. No. 5,275,669 (Van Der Puy et al.), the description of which is incorporated herein by reference. Following this test procedure, 0.5 to 2 mL of the test azeotrope-like composition was added to a vial. An equal volume of n-octane (n-$C_8H_{18}$) was then added to the same vial. The vial was sealed by closing the lid, then the vial was shaken to mix the two components. If a cloudy mixture or a phase split occurred after settling undisturbed for several minutes, the azeotrope-like composition was given an LSH ("largest soluble hydrocarbon") rating of <8. If a clear solution resulted, the test was repeated, substituting n-nonane (n-$C_9H_{20}$) for n-octane. If a cloudy mixture or a phase split occurred, the azeotrope-like composition was given an LSH rating of 8. The test was continually repeated with higher homologue n-alkanes up to n-heneicosane (n-$C_{21}H_{44}$) until a cloudy mixture or a phase split occurred. The LSH rating given corresponded to the carbon chain length of the largest soluble n-alkane which formed a homogeneous solution at equal volumes with the test azeotrope-like composition. For example, if n-decane (n-$C_{10}H_{22}$) was the largest soluble n-alkane but n-undecane (n-$C_{11}H_{24}$) caused a phase split, the LSH rating was recorded as 10. The hydrocarbon solubilities in the azeotrope-like compositions were measured both at room temperature and at the boiling points of the azeotrope-like compositions, the latter done by immersing each test vial in a constant temperature bath to equilibrate. Results are presented in TABLE 3.

TABLE 3

| Ex. | Organic Solvent Name | Organic Solvent Type | HFE Concentration (wt. %) | Organic Solvent Concentration (wt. %) | LSH at Room Temperature | LSH at Boiling Point |
|---|---|---|---|---|---|---|
| 19 | n-octane | unsubstituted straight chain, branched and cyclic saturated alkanes containing 8 to 11 carbon atoms | 71.6 | 28.4 | 9 | NR |
| 20 | 1,3-dimethyl cyclohexane | | 65.1 | 34.9 | 10 | NR |
| 21 | ISOPAR ™ G | | 95.4 | 4.6 | 9 | 18 |
| 22 | 1-chloro-n-pentane | chlorinated straight chain and branched saturated alkanes containing 5 to 7 carbon atoms | 53.4 | 46.6 | 12 | NR |
| 23 | 1-chloro-n-hexane | | 74.8 | 25.2 | 10 | NR |
| 24 | 1-chloro-n-heptane | | 93.1 | 6.9 | 9 | 18 |
| 25 | Toluene | aromatic and unsaturated cyclic halogenated or unhalogenated hydrocarbons containing 7 to 10 carbon atoms | 57.7 | 42.3 | 11 | NR |
| 26 | m-xylene | | 80.8 | 19.2 | 9 | NR |
| 27 | α-pinene | | 88.5 | 11.5 | 8 | 18 |
| 28 | β-pinene | | 94.2 | 5.8 | 8 | 17 |
| 29 | p-chlorobenzotrifluoride | | 75.7 | 24.3 | 11 | 21 |
| 30 | n-butyl acetate | esters containing 6 carbon atoms | 67.9 | 32.1 | 13 | NR |
| 31 | iso-butyl acetate | | 56.8 | 43.2 | 15 | NR |
| 32 | n-propyl n-propionate | | 63.8 | 36.2 | 13 | NR |
| 33 | methyl isobutyl ketone | ketones containing 6 to 7 carbon atoms | 59.1 | 40.9 | 15 | NR |
| 34 | 2-heptanone | | 89.6 | 10.4 | 10 | 20 |
| 35 | diethylene glycol dimethyl ether | glycol ethers containing 6 carbon atoms | 93.6 | 6.4 | 9 | 18 |
| 36 | octamethyl trisiloxane | siloxanes containing 8 carbon atoms | 87.1 | 12.9 | 9 | NR |
| C2 | NONE | HFE alone | 100.0 | — | 8 | |

NR = not run

The data in TABLE 3 show that hydrocarbon alkanes are very soluble in the azetrope-like compositions of this invention particularly at their boiling point, so the azetrope-like compositions are excellent solvents for the cleaning process of this invention. These compositions will also be effective as solvents for depositing hydrocarbon coatings, e.g., coatings of lubricant, onto substrate surfaces.

Examples 37–54

Percentage ranges for azeotrope-like compositions of this invention were identified by determining boiling points of test compositions made by mixing 3-ethoxy-perfluoro(2-metylhexane) with various organic solvents using an ebulliometer or boiling point apparatus (specifically a Model MBP-100 available from Cal-Glass for Research, Inc., Costa Mesa, Calif.). To run this test, the lower boiling component of the test compositions (typically an amount of 25 to 30 mL) was added to the boiling point apparatus, heated and allowed to equilibrate to its boiling point (typically about 30 minutes). After equilibration, the boiling point was recorded, a 1.0 mL aliquot of the higher boiling component was added to the apparatus, and the resulting new composition was allowed to equilibrate for about 30 minutes, at which time the boiling point was recorded. The test continued basically as described above, with additions to the test mixture of 1.0 mL of the higher boiling point component occurring every 30 minutes until 15 to 20 mL of the higher boiling point component had been added. The presence of an azeotrope was noted when the test mixture exhibited a lower boiling point than the boiling point of the lower boiling component of the test mixture. The compositions corresponding to the aforementioned boiling points were determined. The composition (weight percent) of the test organic solvent in the composition was then plotted as a function of boiling point. By examining each plot, azeotrope-like composition ranges were identified (on a weight percent basis) which boiled at temperatures within about 1° C. of the respective azeotrope boiling point (the azeotrope defined as that composition giving the lowest boiling point).

The resulting azeotrope-like composition ranges and corresponding boiling temperature range (1° C. from the azeotrope boiling temperature, 0.4° C. from the azeotrope boiling temperature for ISOPAR™ G) are presented in TABLE 4. The organic solvents are labeled as "Solvent" and the 3-ethoxy-perfluoro(2-methylhexane) is labeled as "Ether". All boiling tests were run under a pressure of 760±1 torr at which pure 3-ethoxy-perfluoro(2-methylhexane) boils at about 130° C.

TABLE 4

| Ex. | Organic Solvent | Solvent Concentration (wt. %) | Ether Concentration (wt. %) | Boiling Temperature Range (° C.) |
| --- | --- | --- | --- | --- |
| 37 | n-octane | 13.9–59.1 | 86.1–40.9 | 115.5–116.5 |
| 38 | dimethylcyclohexane | 21.1–68.3 | 78.9–31.7 | 112.0–113.0 |
| 39 | ISOPAR ™ G | 0.1–11.3 | 99.9–88.7 | 129.7–130.1* |
| 40 | 1-chloro-n-pentane | 26.2–80.0 | 73.8–20.0 | 103.8–104.8 |
| 41 | 1-chloro-n-hexane | 11.2–44.6 | 88.8–55.4 | 120.1–121.1 |
| 42 | 1-chloro-n-heptane | 2.3–32.2 | 97.7–67.8 | 128.0–129.0 |
| 43 | toluene | 24.4–76.0 | 75.6–24.0 | 105.1–106.1 |
| 44 | m-xylene | 8.5–42.0 | 91.5–58.0 | 122.3–123.3 |
| 45 | α-pinene | 3.7–35.0 | 96.3–65.0 | 127.1–128.1 |
| 46 | β-pinene | 0.3–23.3 | 99.7–76.7 | 128.8–129.8 |
| 47 | p-chlorobenzotrifluoride | 9.0–48.0 | 91.0–52.0 | 126.8–127.8 |
| 48 | n-butyl acetate | 16.8–64.0 | 83.2–36.0 | 117.6–118.6 |
| 49 | isobutyl acetate | 27.1–77.1 | 72.9–22.9 | 112.2–113.2 |
| 50 | n-propyl n-propionate | 19.5–69.0 | 80.5–31.0 | 115.7–116.7 |
| 51 | methyl isobutyl ketone | 26.9–76.0 | 73.1–24.0 | 110.9–111.9 |
| 52 | 2-heptanone | 3.5–31.0 | 96.5–69.0 | 127.7–128.7 |
| 53 | diethylene glycol dimethyl ether | 0.1–24.8 | 99.9–75.2 | 128.9–129.7 |
| 54 | octamethyl trisiloxane | 3.8–33.1 | 96.2–66.9 | 127.4–128.4 |

*Boiling point of pure $C_3F_7CF(OC_2H_5)CF(CF_3)_2$

The data in TABLE 4 show that azeotropic compositions containing 3-ethoxy-perfluoro(2-methylhexane) and a variety of organic solvents can be formulated which exhibit a large composition range but a narrow boiling point range.

Various modifications and alterations of this invention will be apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:
1. An azeotrope-like composition comprising:

(a) 3-ethoxy-perfluoro(2-methyl hexane); and
(b) organic solvent;

wherein said composition is selected from the group consisting of:
(i) compositions consisting essentially of about 86 to about 41 weight percent of 3-ethoxy-perfluoro(2-methylhexane) and about 14 to about 59 weight percent of n-octane that boil at about 115.5 to about 116.5° C. at about 760 torr;
(ii) compositions consisting essentially of about 79 to about 32 weight percent of 3-ethoxy-perfluoro(2-methylhexane) and about 21 to about 68 weight percent of 1,3-dimethylcyclohexane that boil at about 112.0 to about 113.0° C. at about 760 torr; and
(iii) compositions consisting essentially of about 99.9 to about 89 weight percent of 3-ethoxy-perfluoro(2-methylhexane) and about 0.1 to about 11 weight percent of ISOPAR™ G (a mixture of high purity $C_{10}$–$C_{11}$ isoparaffinic hydrocarbons) that boil at about 129.7 to about 130.1° C. at about 760 torr.

2. The azeotrope-like composition according to claim 1, comprising:

(a) 3-ethoxy-perfluoro(2-methyl hexane); and
(b) organic solvent;

wherein said composition is an azeotrope selected from the group consisting of:
(i) a composition consisting essentially of about 71.6 weight percent of 3-ethoxy-perfluoro(2-methylhexane) and about 28.4 weight percent of n-octane that boils at about 113.1° C. at about 731.9 torr;
(ii) a composition consisting essentially of about 65.1 weight percent of 3-ethoxy-perfluoro(2- methylhexane) and about 34.9 weight percent of 1,3-dimethylcyclohexane that boils at about 109.7° C. at about 731.5 torr; and (iii) a composition consisting essentially of about 95.4 weight percent of 3-ethoxy-perfluoro(2-methylhexane) and about 4.6 weight percent of ISOPAR™ G (a mixture of high purity $C_{10}$–$C_{11}$ isoparaffinic hydrocarbons) that boils at about 126.7° C. at about 729.3 torr.

3. An azeotrope-like composition comprising:

(a) 3-ethoxy-perfluoro(2-methyl hexane); and (b) organic solvent;

wherein said composition is selected from the group consisting of:
(i) compositions consisting essentially of about 74 to about 20 weight percent of 3-ethoxy-perfluoro(2-methylhexane) and about 26 to about 80 weight percent of 1-chloro-n-pentane that boil at about 103.8 to about 104.8° C. at about 760 torr;
(ii) compositions consisting essentially of about 89 to about 55 weight percent of 3-ethoxy-perfluoro(2-methylhexane) and about 11 to about 45 weight percent of 1-chloro-n-hexane that boil at about 120.1 to about 121.1° C. at about 760 torr; and
(iii) compositions consisting essentially of about 98 to about 68 weight percent of 3-ethoxy-perfluoro(2-methylhexane) and about 2 to about 32 weight percent of 1-chloro-n-heptane that boil at about 128.0 to about 129.0° C. at about 760 torr.

4. The azeotrope-like composition according to claim 3, comprising:

(a) 3-ethoxy-perfluoro(2-methyl hexane); and (b) organic solvent;

wherein said composition is an azeotrope selected from the group consisting of:
(i) a composition consisting essentially of about 53.4 weight percent of 3-ethoxy-perfluoro(2-methylhexane) and about 46.6 weight percent of 1-chloro-n-pentane that boils at about 102.9° C. at about 725.9 torr;
(ii) a composition consisting essentially of about 74.8 weight percent of 3-ethoxy-perfluoro(2-methylhexane) and about 25.2 weight percent of 1-chloro-n-hexane that boils at about 118.3° C. at about 734.3 torr; and
(iii) a composition consisting essentially of about 93.1 weight percent of 3-ethoxy-perfluoro(2-methylhexane) and about 6.9 weight percent of 1-chloro-n-heptane that boils at about 126° C. at about 738.4 torr.

5. An azeotrope-like composition comprising:

(a) 3-ethoxy-perfluoro(2-methyl hexane); and (b) organic solvent;

wherein said composition is selected from the group consisting of:
(i) compositions consisting essentially of about 76 to about 24 weight percent of 3-ethoxy-perfluoro(2-methylhexane) and about 24 to about 76 weight percent of toluene that boil at about 105.1 to about 106.1° C. at about 760 torr;
(ii) compositions consisting essentially of about 91 to about 58 weight percent of 3-ethoxy-perfluoro(2-methylhexane) and about 9 to about 42 weight percent of m-xylene that boil at about 122.3 to about 123.3° C. at about 760 torr;

(iii) compositions consisting essentially of about 96 to about 65 weight percent of 3-ethoxy-perfluoro(2-methylhexane) and about 4 to about 35 weight percent of α-pinene that boil at about 127.1 to about 128.1° C. at about 760 torr;
(iv) compositions consisting essentially of about 99.7 to about 77 weight percent of 3-ethoxy-perfluoro(2-methylhexane) and about 0.3 to about 23 weight percent of β-pinene that boil at about 128.8 to about 129.8° C. at about 760 torr; and
(v) compositions consisting essentially of about 91 to about 52 weight percent of 3-ethoxy-perfluoro(2-methylhexane) and about 9 to about 48 weight percent of p-chlorobenzotrifluoride that boil at about 126.8 to about 127.8° C. at about 760 torr.

6. The azeotrope-like composition according to claim 5, comprising:

(a) 3-ethoxy-perfluoro(2-methyl hexane); and (b) organic solvent;

wherein said composition is an azeotrope selected from the group consisting of:
(i) a composition consisting essentially of about 57.7 weight percent of 3-ethoxy-perfluoro(2-methylhexane) and about 42.3 weight percent of toluene that boils at about 103.0° C. at about 732.5 torr;
(ii) a composition consisting essentially of about 80.8 weight percent of 3-ethoxy-perfluoro(2-methylhexane) and about 19.2 weight percent of m-xylene that boils at about 119.7° C. at about 734.4 torr;
(iii) a composition consisting essentially of about 88.5 weight percent of 3-ethoxy-perfluoro(2-methylhexane) and about 11.5 weight percent of α-pinene that boils at about 125.3° C. at about 734 torr;
(iv) a composition consisting essentially of about 94.2 weight percent of 3-ethoxy-perfluoro(2-methylhexane) and about 5.8 weight percent of β-pinene that boils at about 126.7° C. at about 732.7 torr; and
(v) a composition consisting essentially of about 75.7 weight percent of 3-ethoxy-perfluoro(2-methylhexane) and about 24.3 weight percent of p-chlorobenzotrifluoride that boil at about 124° C. at about 728.1 torr.

7. An azeotrope-like composition comprising:

(a) 3-ethoxy-perfluoro(2-methyl hexane); and (b) organic solvent;

wherein said composition is selected from the group consisting of:
(i) compositions consisting essentially of about 83 to about 36 weight percent of 3-ethoxy-perfluoro(2-methylhexane) and about 17 to about 64 weight percent of n-butyl acetate that boil at about 117.6 to about 118.6° C. at about 760 torr;
(ii) compositions consisting essentially of about 73 to about 23 weight percent of 3-ethoxy-perfluoro(2-methylhexane) and about 27 to about 77 weight percent of isobutyl acetate that boil at about 112.2 to about 113.2° C. at about 760 torr; and
(iii) compositions consisting essentially of about 80 to about 31 weight percent of 3-ethoxy-perfluoro(2-methylhexane) and about 20 to about 69 weight percent of n-propyl n-propionate that boil at about 115.7 to about 116.7° C. at about 760 torr.

8. The azeotrope-like composition according to claim 7, comprising:
(a) 3-ethoxy-perfluoro(2-methyl hexane); and
(b) organic solvent;
wherein said composition is an azeotrope selected from the group consisting of:
(i) a composition consisting essentially of about 67.9 weight percent of 3-ethoxy-perfluoro(2-methylhexane) and about 32.1 weight percent of n-butyl acetate that boils at about 116° C. at about 732 torr;
(ii) a composition consisting essentially of about 56.8 weight percent of 3-ethoxy-perfluoro(2-methylhexane) and about 43.2 weight percent of isobutyl acetate that boils at about 110.1° C. at about 732.2 torr; and
(iii) a composition consisting essentially of about 63.8 weight percent of 3-ethoxy-perfluoro(2-methylhexane) and about 36.2 weight percent of n-propyl n-propionate that boils at about 114.2° C. at about 731.9 torr.

9. An azeotrope-like composition comprising:
(a) 3-ethoxy-perfluoro(2-methyl hexane); and
(b) organic solvent;
wherein said composition is selected from the group consisting of:
(i) compositions consisting essentially of about 73 to about 24 weight percent of 3-ethoxy-perfluoro(2-methylhexane) and about 27 to about 76 weight percent of methyl isobutyl ketone that boil at about 110.9 to about 111.9° C. at about 760 torr; and
(ii) compositions consisting essentially of about 96 to about 69 weight percent of 3-ethoxy-perfluoro(2-methylhexane) and about 4 to about 31 weight percent of 2-heptanone that boil at about 127.7 to about 128.7° C. at about 760 torr.

10. The azeotrope-like composition according to claim 9, comprising:
(a) 3-ethoxy-perfluoro(2-methyl hexane); and
(b) organic solvent;
wherein said composition is an azeotrope selected from the group consisting of:
(i) a composition consisting essentially of about 59.1 weight percent of 3-ethoxy-perfluoro(2-methylhexane) and about 40.9 weight percent of methyl isobutyl ketone that boils at about 109.2° C. at about 732.9 torr; and
(ii) a composition consisting essentially of about 89.6 weight percent of 3-ethoxy-perfluoro(2-methylhexane) and about 10.4 weight percent of 2-heptanone that boils at about 126° C. at about 738.2 torr.

11. An azeotrope-like composition comprising:
(a) 3-ethoxy-perfluoro(2-methyl hexane); and
(b) organic solvent;
wherein said composition is selected from the group consisting of compositions consisting essentially of about 99.9 to about 75 weight percent of 3-ethoxy-perfluoro(2-methylhexane) and about 0.1 to about 25 weight percent of diethylene glycol dimethyl ether that boil at about 128.9 to about 129.9° C. at about 760 torr.

12. The azeotrope-like composition according to claim 11, comprising:
(a) 3-ethoxy-perfluoro(2-methyl hexane); and
(b) organic solvent;
wherein said composition is an azeotrope selected from the group consisting of a composition consisting essentially of about 93.6 weight percent of 3-ethoxy-perfluoro(2-methylhexane) and about 6.4 weight percent of diethylene glycol dimethyl ether that boils at about 126.9° C. at about 738.6 torr.

13. An azeotrope-like composition comprising:
(a) 3-ethoxy-perfluoro(2-methyl hexane); and
(b) organic solvent;
wherein said composition is selected from the group consisting of compositions consisting essentially of about 96 to about 67 weight percent of 3-ethoxy-perfluoro(2-methylhexane) and about 4 to about 33 weight percent of octamethyl trisiloxane that boil at about 127.4 to about 128.4° C. at about 760 torr.

14. The azeotrope-like composition according to claim 13, comprising:
(a) 3-ethoxy-perfluoro(2-methyl hexane); and
(b) organic solvent;
wherein said composition is an azeotrope selected from the group consisting of a composition consisting essentially of about 87.1 weight percent of 3-ethoxy-perfluoro(2-methylhexane) and about 12.9 weight percent of octamethyl trisiloxane that boils at about 125.2° C. at about 733.7 torr.

* * * * *

UNITED STATES PATENT AND TRADEMARK OFFICE
CERTIFICATE OF CORRECTION

PATENT NO. : 6,417,153 B1
DATED : July 9, 2002
INVENTOR(S) : Owens, John G.

Page 1 of 1

It is certified that error appears in the above-identified patent and that said Letters Patent is hereby corrected as shown below:

Title page,
Item [56], OTHER PUBLICATIONS, "Abstract, Derwent Publication Ltd., London, GB, Class E16, AN 1998-141528, JP10018176, (Hakuyosha KK), Jan. 20, 1998." should read
-- Abstract: Derwent Publications Ltd., London, GB, Class E16, AN 1998-141528, JP10018176, (Hakuyosha KK), Jan. 20, 1998.--.

Column 7,
Line 2, "ISOPARTM$^{TM}$" should read -- ISOPAR$^{TM}$ --.

Column 11,
Line 19, "Reaction Medium p The azeotrope-like" should read
--Reaction Medium
The azeotrope-like --.

Signed and Sealed this

Twenty-eighth Day of January, 2003

JAMES E. ROGAN
*Director of the United States Patent and Trademark Office*